Oct. 11, 1938.   H. HÖNIG   2,133,027
APPARATUS FOR MOLDING HOLLOW ARTICLES, FOR EXAMPLE, FROM ARTIFICIAL RESINS
Filed April 3, 1936   12 Sheets-Sheet 1

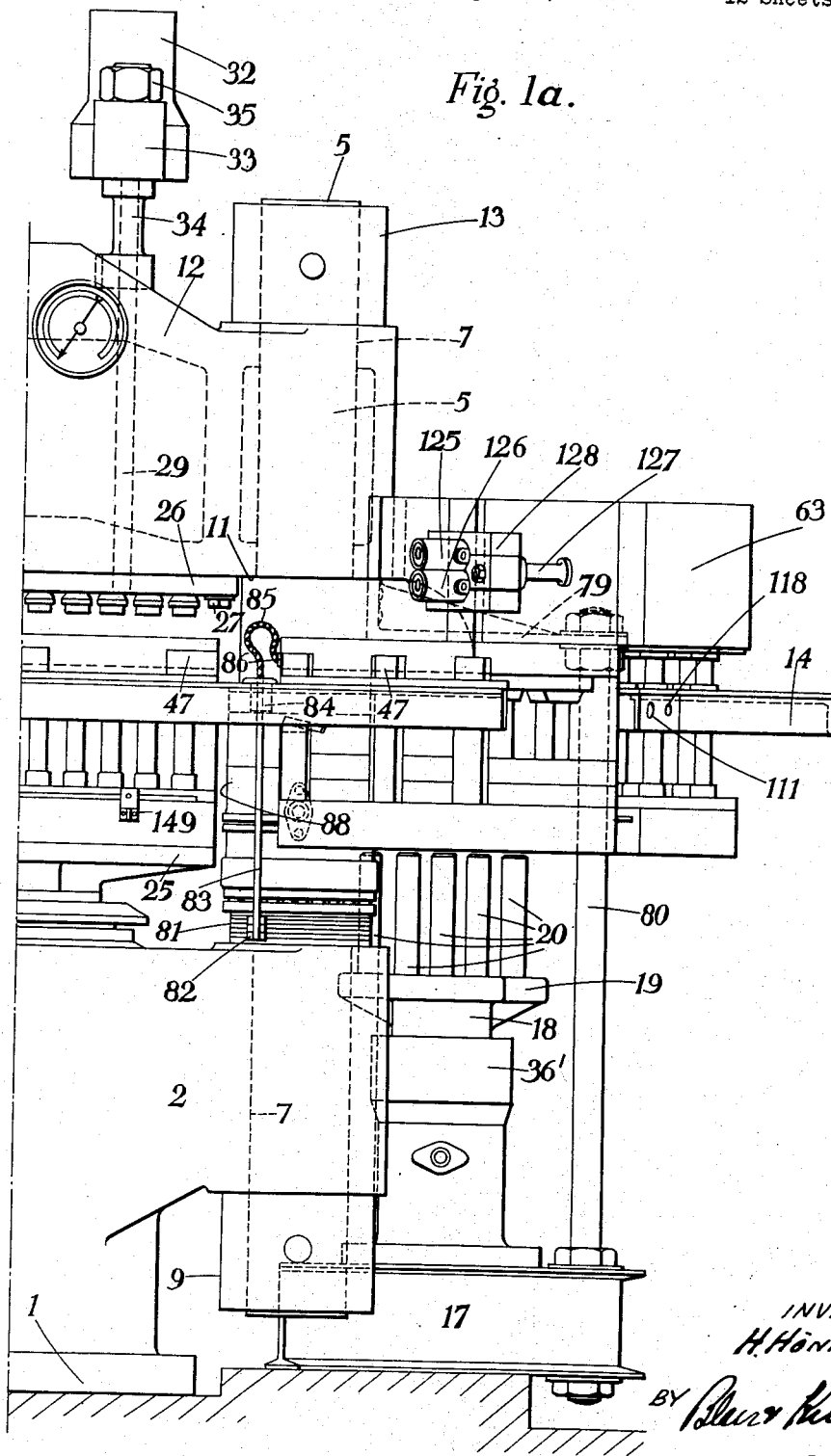

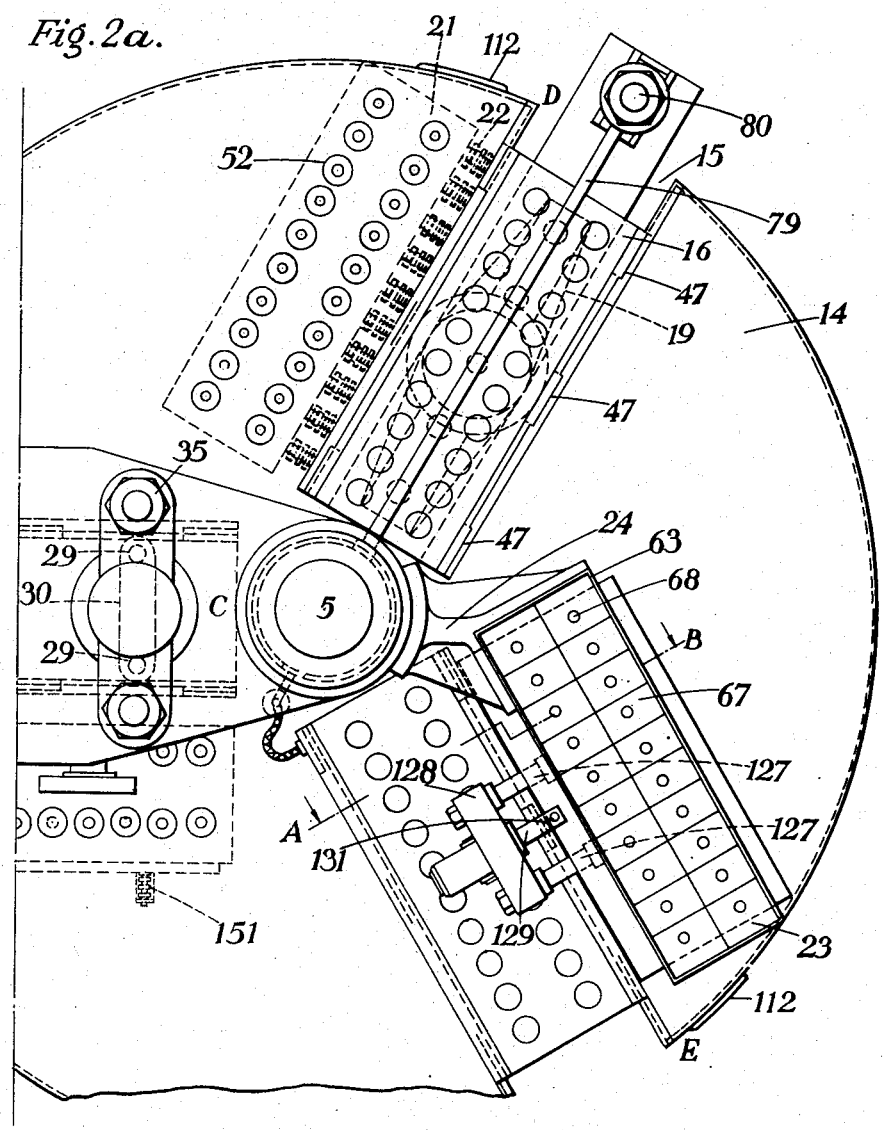

Oct. 11, 1938.  H. HÖNIG  2,133,027
APPARATUS FOR MOLDING HOLLOW ARTICLES, FOR EXAMPLE, FROM ARTIFICIAL RESINS
Filed April 3, 1936    12 Sheets-Sheet 5

INVENTOR
H. Hönig.
BY
ATTORNEY

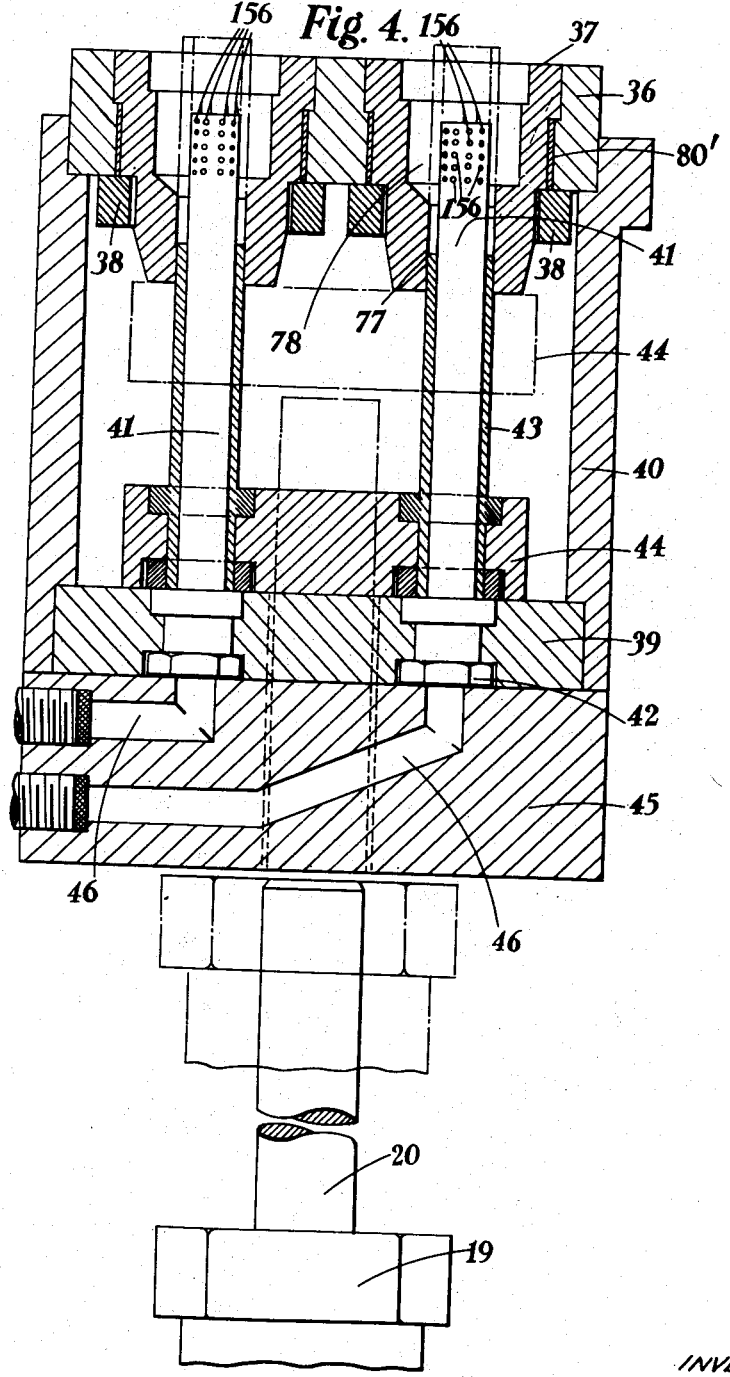

Oct. 11, 1938.　　　　　　H. HÖNIG　　　　　2,133,027
APPARATUS FOR MOLDING HOLLOW ARTICLES, FOR EXAMPLE, FROM ARTIFICIAL RESINS
Filed April 3, 1936　　　12 Sheets-Sheet 7
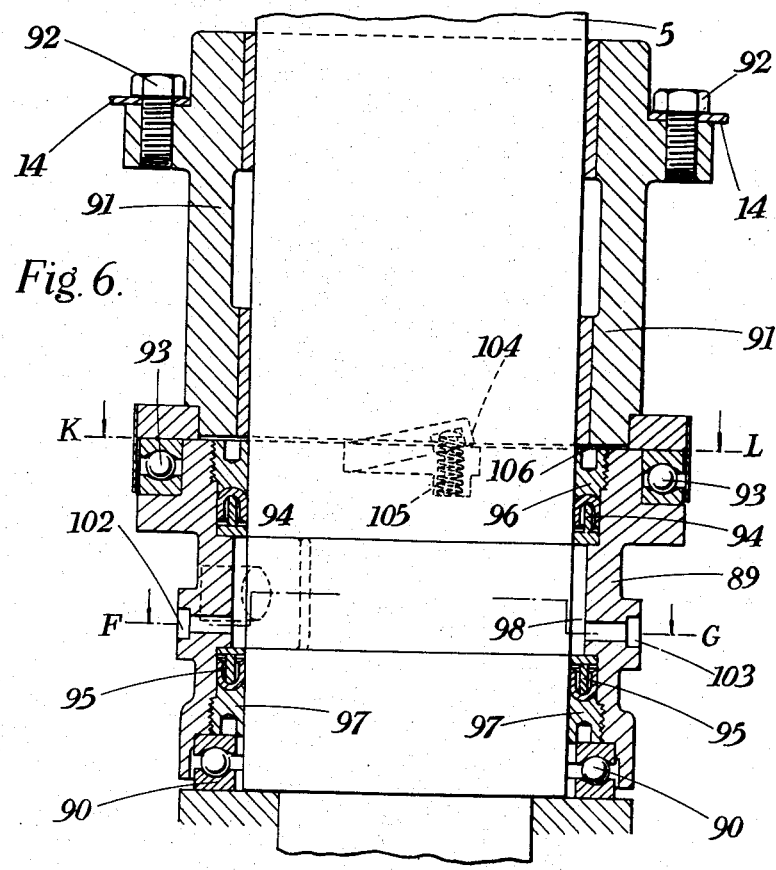
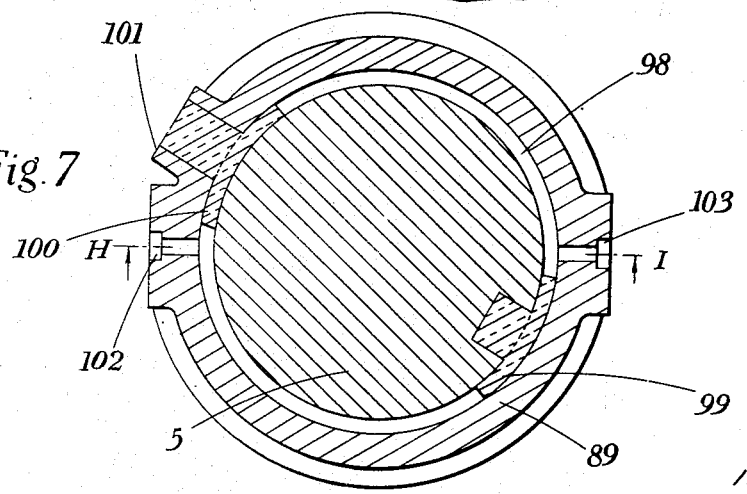
INVENTOR
H. Hönig.
BY
ATTORNEYS

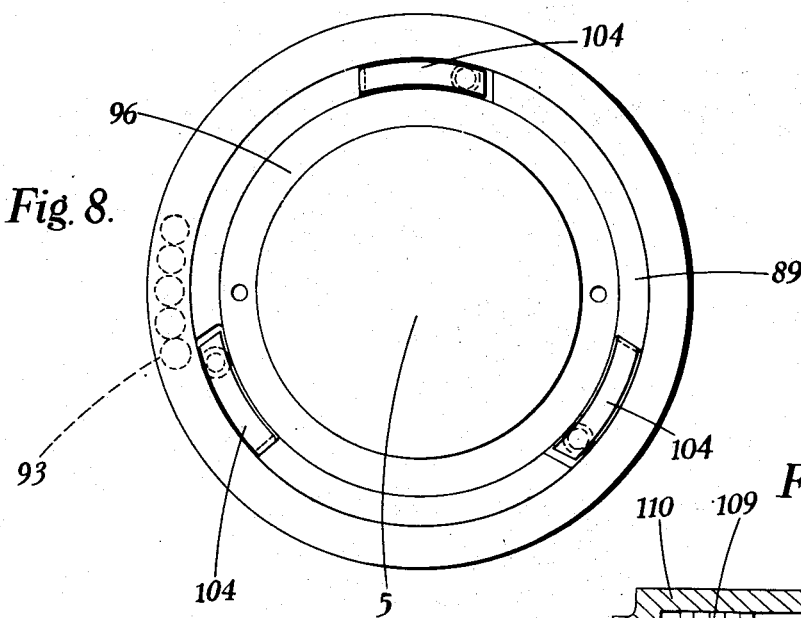
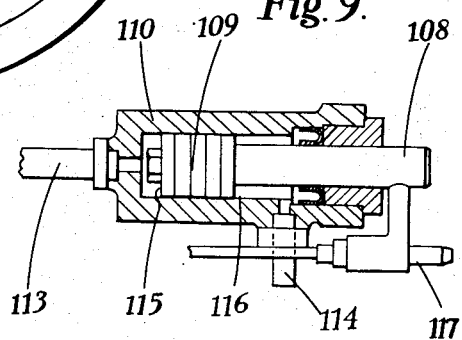
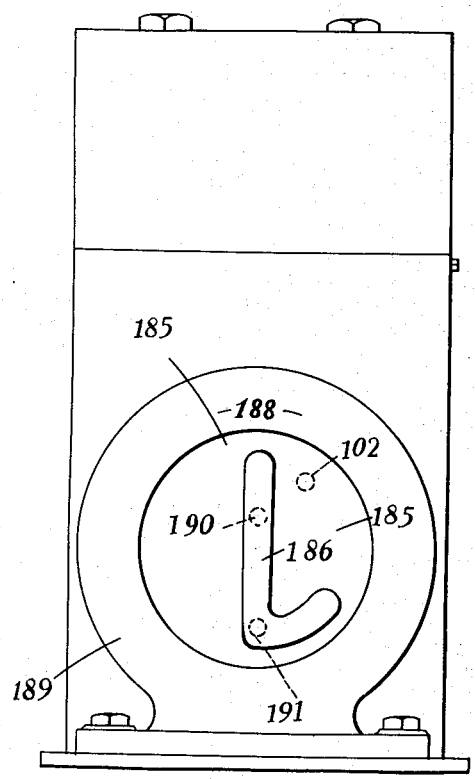

Oct. 11, 1938.   H. HÖNIG   2,133,027
APPARATUS FOR MOLDING HOLLOW ARTICLES, FOR EXAMPLE, FROM ARTIFICIAL RESINS
Filed April 3, 1936   12 Sheets-Sheet 9

INVENTOR
H. Hönig.
BY
ATTORNEYS

Oct. 11, 1938.  H. HÖNIG  2,133,027
APPARATUS FOR MOLDING HOLLOW ARTICLES, FOR EXAMPLE, FROM ARTIFICIAL RESINS
Filed April 3, 1936   12 Sheets-Sheet 11
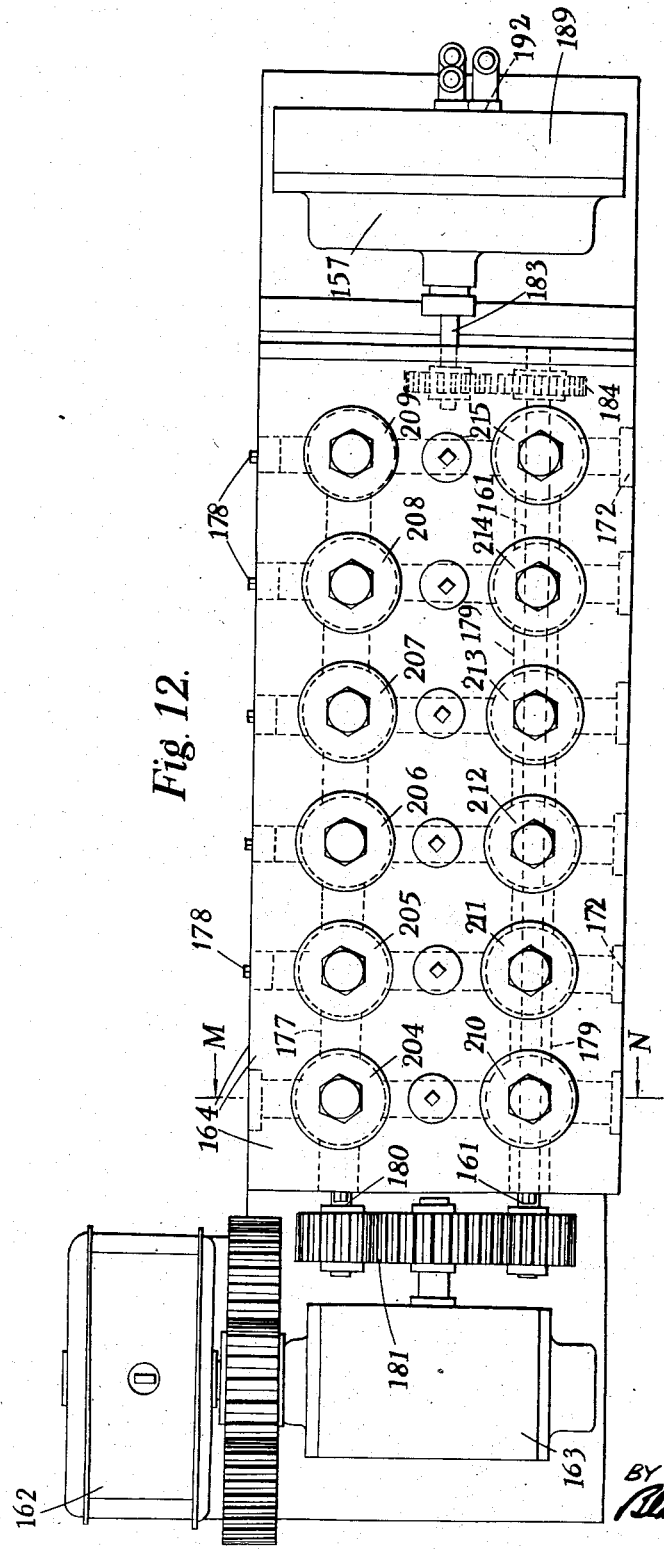
INVENTOR
H. Hönig,
BY
ATTORNEY Oct. 11, 1938.  H. HÖNIG  2,133,027
APPARATUS FOR MOLDING HOLLOW ARTICLES, FOR EXAMPLE, FROM ARTIFICIAL RESINS
Filed April 3, 1936   12 Sheets-Sheet 12
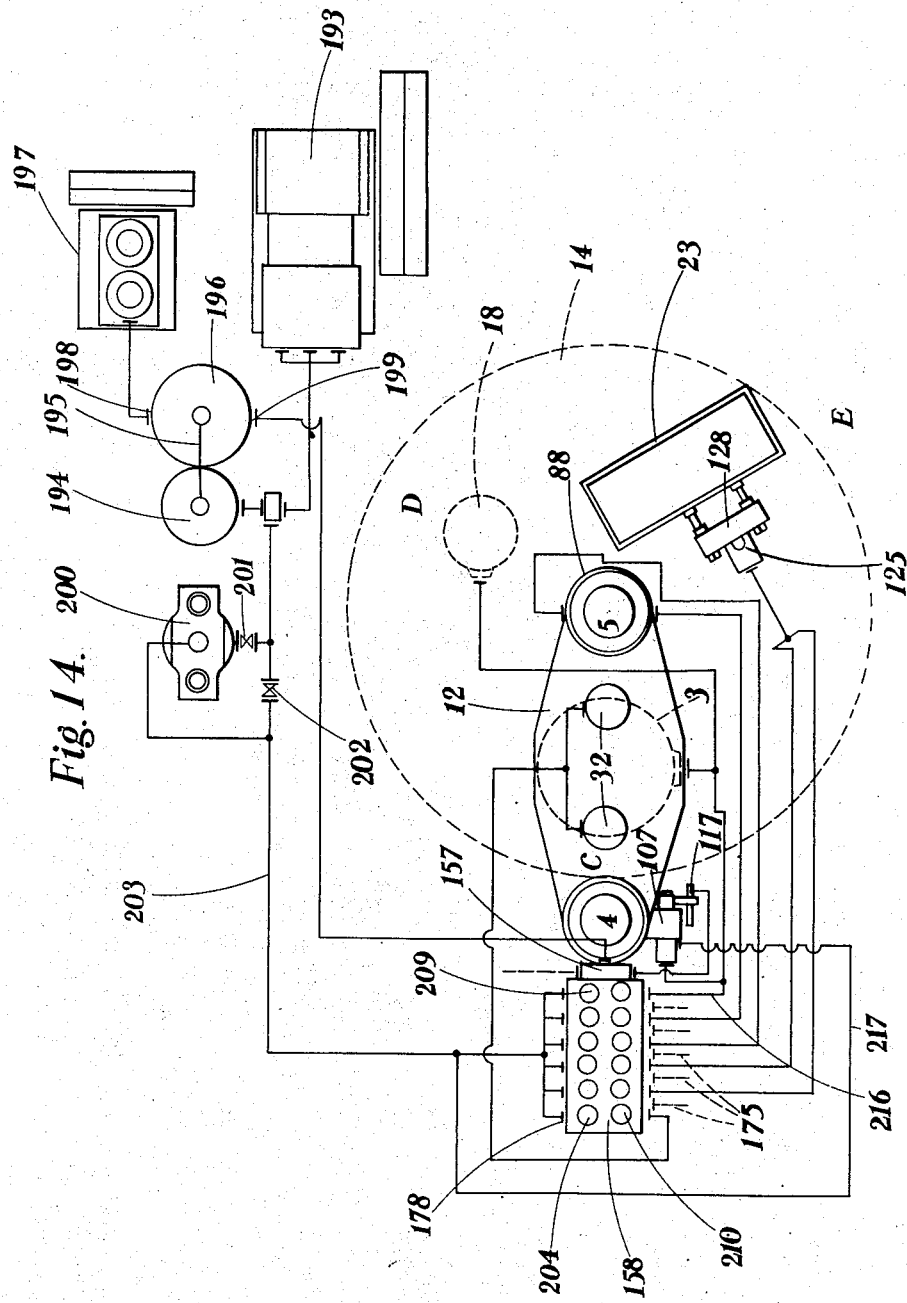
INVENTOR
H. Hönig.
BY
Blair Kilburn
ATTORNEYS Patented Oct. 11, 1938

2,133,027

UNITED STATES PATENT OFFICE 2,133,027

APPARATUS FOR MOLDING HOLLOW ARTICLES, FOR EXAMPLE, FROM ARTIFICIAL RESINS

Heinrich Hönig, Dusseldorf, Germany, assignor to Richard Collins and John Joseph Sheridan, both of Dublin, Irish Free State, and Philip Morris Scher, London, England Application April 3, 1936, Serial No. 72,646
In Great Britain April 10, 1935

17 Claims. (Cl. 18—5)

The present invention relates to improvements in or relating to apparatus for molding hollow articles under pressure from artificial resins which are moldable under the action of heat and pressure. The invention is particularly but not exclusively applicable to apparatus for molding hollow articles having one or more constricted portions such for example as bottles and the like having a constricted neck portion.

An apparatus for molding hollow articles from artificial resins according to the present invention comprises a movable support for one or more molds or mold cavities means for heating said one or more molds or mold cavities and means for blowing moldable composition on to the inner walls of said one or more molds or mold cavities by means of fluid under pressure.

The said movable support preferably carries mold cavities in which case means are provided to cooperate with said mold cavities to close them at one end, and thereby to form completed molds.

Fluid admitted under pressure to the interior of the said mold or molds is employed not only for lining the interior of the molds with the artificial resin composition but also for supplying the necessary molding pressure. If desired, separate sources of fluid under pressure may be employed for lining the molds and for applying the molding pressure. In either case one or more common nozzles or the like may be employed for supplying the moldable composition to the interior of the mold or molds and for supplying the fluid under pressure for applying the molding pressure. These nozzles may be connected in turn to a source of low pressure fluid preferably air, for lining the molds and to a source of high pressure fluid preferably air, for applying the molding pressure. It is preferred however to employ merely a source of air under high pressure for both lining the molds and applying the necessary molding pressure.

The fluid under pressure preferably air for applying the molding pressure will be at a suitable pressure according to the resin employed and may for example be at a pressure of about 200 atmospheres.

The apparatus also preferably comprises means for ejecting finished articles from the mold or molds, or mold cavities.

If the apparatus is to be employed for molding hollow articles having one or more constrictions, the mold or molds must be separable. In the case of articles having a single constriction, such for example as bottle shaped articles having a narrow neck and an enlarged body portion the mold or each mold may be provided with a removable or separable base and the articles may be removed axially of the mold. In this case a suitable mold block may include a number of molding cavities the said cavities having at the lower or upper part a relatively narrow diameter corresponding to the external diameter of the neck to be formed and at the upper or lower part a relatively greater diameter corresponding to the external diameter of the body of the bottle or other article.

The neck portions of the individual mold cavities may serve for the introduction through suitable nozzles which fit tight against the molds of fluid for example air under pressure for lining the molds and/or for pressure molding and the molds may be completed by heads fitting and extending a certain distance into the body portions of the cavities. The said heads may be carried by a plunger adapted to move towards the mold block and/or the mold block may be moved towards and into engagement with the heads to complete the molds. If desired of course a single mold, instead of a plurality in the block, may be constructed in a similar manner.

The aforesaid nozzles may be carried with the mold or molds or mold cavities or alternatively the molds or mold cavities may be brought into operative relation with the nozzles at a suitable stage in the operation of the machine. If the nozzles are movable with the molds, means are provided for connecting them to a supply of fluid under pressure and with a supply of the molding composition for example a molding powder.

For charging a mold with the resin molding composition it is preferred to provide means for supplying a preferably measured quantity of molding composition to a suitable chamber, cavity or conduit which may be connected on the one hand to a source of fluid under pressure and on the other hand, to a nozzle or the like for charging the mold. The nozzles or the like are preferably provided with a large number of apertures directed towards the sides and base of the mold so as to direct the molding composition to the walls of the mold.

In cases where the nozzle or nozzles is/are carried with the one or more molds or mold cavities, the said filling chambers, cavities or the like are preferably also carried by the movable support and may be brought into registry with means for supplying preferably definite or measured quantities of moldable material thereto. The said filling chamber or chambers or the like may be connected to the nozzles by means of suitable conduits. Means are provided for closing the material inlet to each said filling chamber or the like in order to prevent escape of fluid under pressure therethrough. Where a plurality of such filling chambers is provided they may be connected through suitable conduits to a conduit common to some or all of them and means may be provided for connecting such common conduit with a supply of fluid for example air under pressure.

The one or more molds or mold cavities, preferably in one or more mold blocks as above set forth, may be carried by a rotary table. Such table may be rotated by any suitable means such for example as by a suitable hydraulic motor and means are preferably provided for rotating the table in steps or stages so as to bring the one or more molds or mold cavities into successive positions for charging the molds and/or filling chambers, pressure molding, discharging the molded articles and if necessary, cleaning the molds or cavities. If desired two or more of these operations may be carried out at a single station, for example the operations of charging the molds and pressure molding.

Means are preferably provided for locking the table in the successive positions and such means may be associated with means for connecting the table, nozzles or the like carried by it with a source of fluid under pressure.

The mold or molds, mold blocks or the like may be mounted so as to be vertically slidable so that they can be pushed upwards or downwards into engagement with the charging and/or pressure nozzles and/or with closure heads for the molds. If desired, said nozzles and/or heads may be vertically movable.

The nozzle or nozzles may enter the one or more molds or mold cavities from below and the articles ejected upwards or the nozzle or nozzles may enter from above in which case the articles may be ejected downwards or means may be provided for reversing the mold or molds or the like in which case the articles may again be ejected upwardly by suitable ejecting members which are caused to enter the molds. The finished articles may be removed by hand or automatically, if desired on to a suitable conveyor.

Means, preferably electrical, may be employed for heating mold cavities and/or mold closure heads. If desired, the fluid under pressure for supplying the molding pressure may also be heated.

It is preferred to employ hydraulic means for operating the various moving parts of the apparatus and such means may be controlled by suitable valves which may be automatically operated in desired sequence by any suitable means for example by cams or the like which may in turn be electrically driven. The supply of fluid under pressure may likewise be controlled automatically.

If the apparatus is to be employed for molding articles which have external constrictions intermediate their ends, molds or mold cavities which are split and are separable laterally may be employed.

One convenient form of apparatus comprises a rotary table mounted for rotation in a horizontal plane and a plurality of mold assemblies carried by said table in spaced relation one to another, said mold assemblies each comprising a plurality of mold cavities open at the top, a perforated nozzle extending from below into each mold cavity and each connected to a separate filling chamber, and a conduit having an inlet at the edge of the rotary table and having branches connected to the several filling chambers and thence to the nozzles. The assemblies are carried by the rotary table so as to be vertically movable therein. Arranged at suitable distances round the table are a station at which the filling chambers are charged, a station at which the material charged into the filling chambers is blown into the molds and molded under pressure to hollow articles and a station at which the finished articles are ejected from the molds. In this form of apparatus the mold cavities are open at the top. The charging station comprises means located above the table for supplying a predetermined quantity of molding powder to each filling chamber. At the molding station a vertically movable plunger is disposed beneath the table adapted upon rising, to raise a mold assembly and to bring the open tops of the mold cavities into tight engagement with a plurality of heads which form closures for the cavities to complete the molds. There is also a plunger which is movable into engagement with a recess in the side wall of the table to lock the table in fixed position. This plunger carries a nozzle adapted to make airtight engagement with the aforesaid inlet at the edge of the table. Above the table also is a vertically movable plunger (or there may be more than one) carrying rods adapted to engage the upper part of the assembly to separate the mold cavities from the heads at the conclusion of the molding operation. The mold cavities are surrounded by electrical heating units to which current is supplied and the said closure heads are also electrically heated. At the ejection station a vertically movable plunger is arranged below the table and this plunger carries ejection rods adapted to engage a plate carrying ejection sleeves surrounding the perforated nozzles to raise said sleeves and eject finished articles upwardly from the mold cavities. The said plungers are operated hydraulically, and the rotary table is driven by an oscillating hydraulic motor having a one way drive connection with the table whereby the latter may be intermittently rotated.

Suppose that a mold assembly has just received its charge at the charging station. The table is rotated to bring the assembly to the molding station. At this instant a valve controlling movement of the hydraulic motor is closed to stop the table, whereupon a valve controlling the liquid supply to the molding plunger, the table locking plunger and the ejection plunger is opened causing these plungers to move. As the table is locked in position and the assembly is held in elevated position against the closure heads, an air valve is opened to blow the powder from the filling chambers to the molds. The powder adheres to the hot walls of the mold and flows to form a coating over the inner surface. A time switch then operates to stop movement of all valve controlling parts preferably cams or the like and after a suitable time, the control mechanism is brought into operation again to permit the fluid to escape from behind the plungers whereby they return to their original position. As this occurs, the hydraulic motor is reversed but does not carry the table with it. The mold assemblies are lowered and the upper plunger is actuated to assist lowering of the assembly from the closure heads. The table is then further rotated when free to move the assembly to the ejecting station, to move an empty assembly to the charging station and to move a charged assembly to the molding station. It will be apparent that ejection takes place at the ejecting station when the molding plunger is being caused to close the molds, and that charging is effected at the charging station at the same time. Just before the molding plunger is lowered, the supply of compressed air is cut off and the interior of the molds is opened to atmosphere.

It will be understood that any suitable means may be provided for supplying fluid under pressure for molding and for operating the various hydraulic appliances. The whole may be controlled by valves operated by one or more cam shafts controlled in turn electrically by the time switch. Means may be provided for varying the working pressure and/or temperatures and/or timing employed to suit particular molding compositions.

In order that the invention may be well understood a preferred embodiment will now be described by way of example only with reference to the accompanying drawings in which:—

Figure 4 is a sectional elevation of the mold box to enlarged scale,

Figure 5:
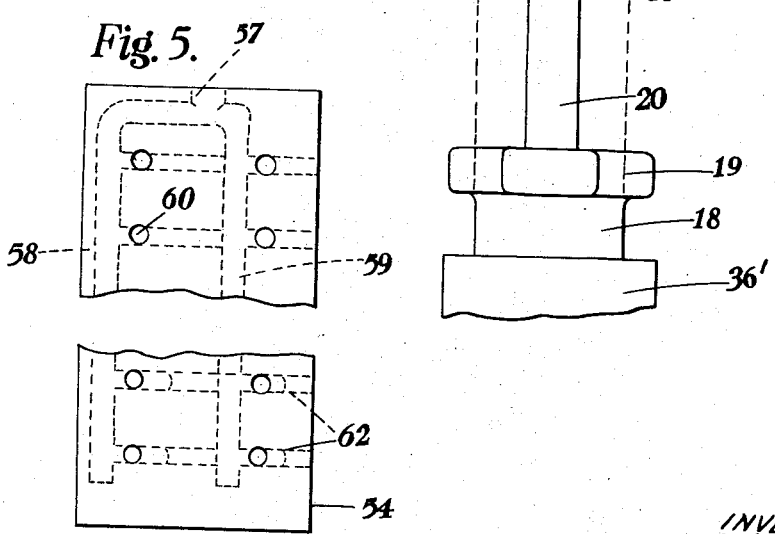
Figure 10:
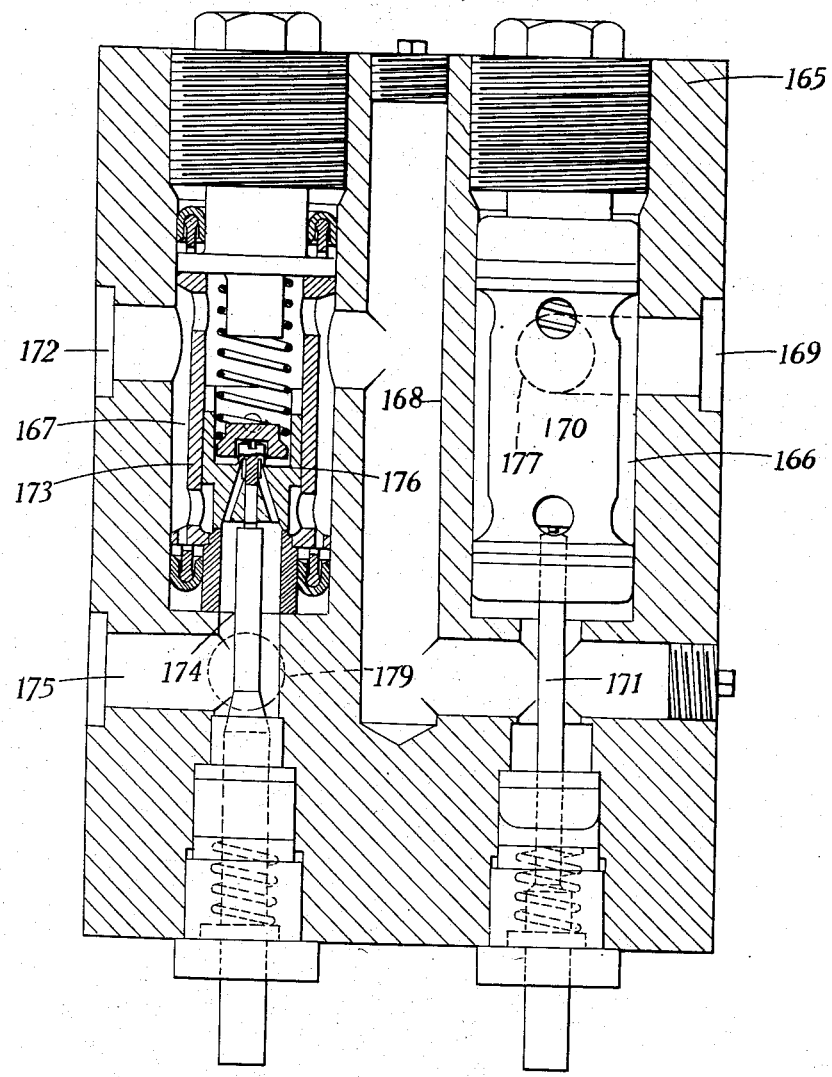
Figure 11:
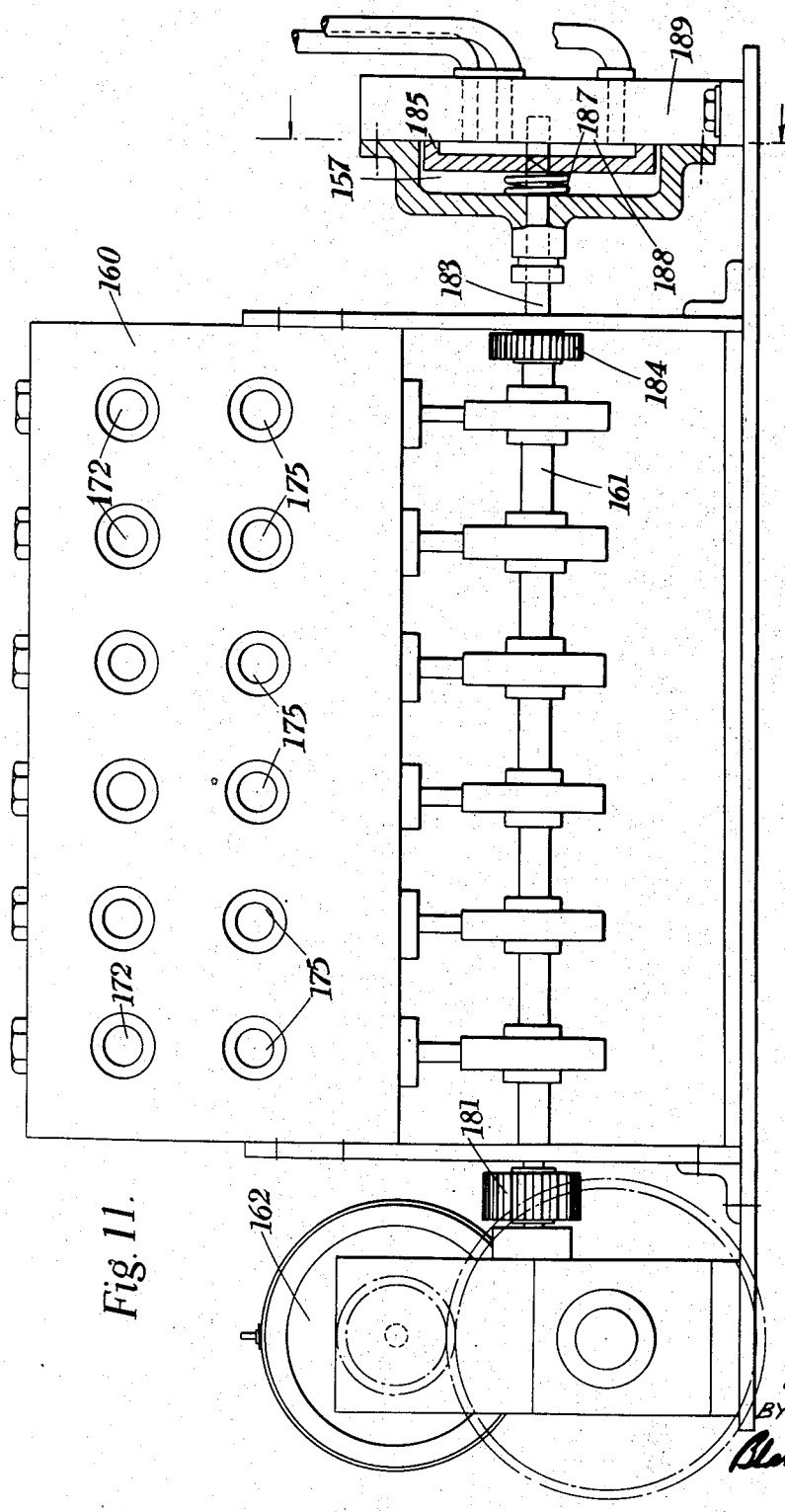

Figure 5 is a plan view of the bottom plate of the filling box, the air conduits being shown by dotted lines, Figure 6 is a vertical section through the water motor, taken along the line H—I of Figure 7, Figure 7 is a sectional plan taken on the line F—G of Figure 6, Figure 8 is a sectional plan taken on the line K—L of Figure 6, Figure 9 is a sectional elevation of the table locking unit, Figure 10 is a vertical section on the line M—N of Figure 12 illustrating in detail a pair of piston valves, Figure 11 is a side elevation of the entire valve unit, Figure 12 is a plan view of Figure 11, Figure 13 is an end elevation of Figure 11, and Figure 14 is a general lay-out showing the piping arrangements.

Figure 1:
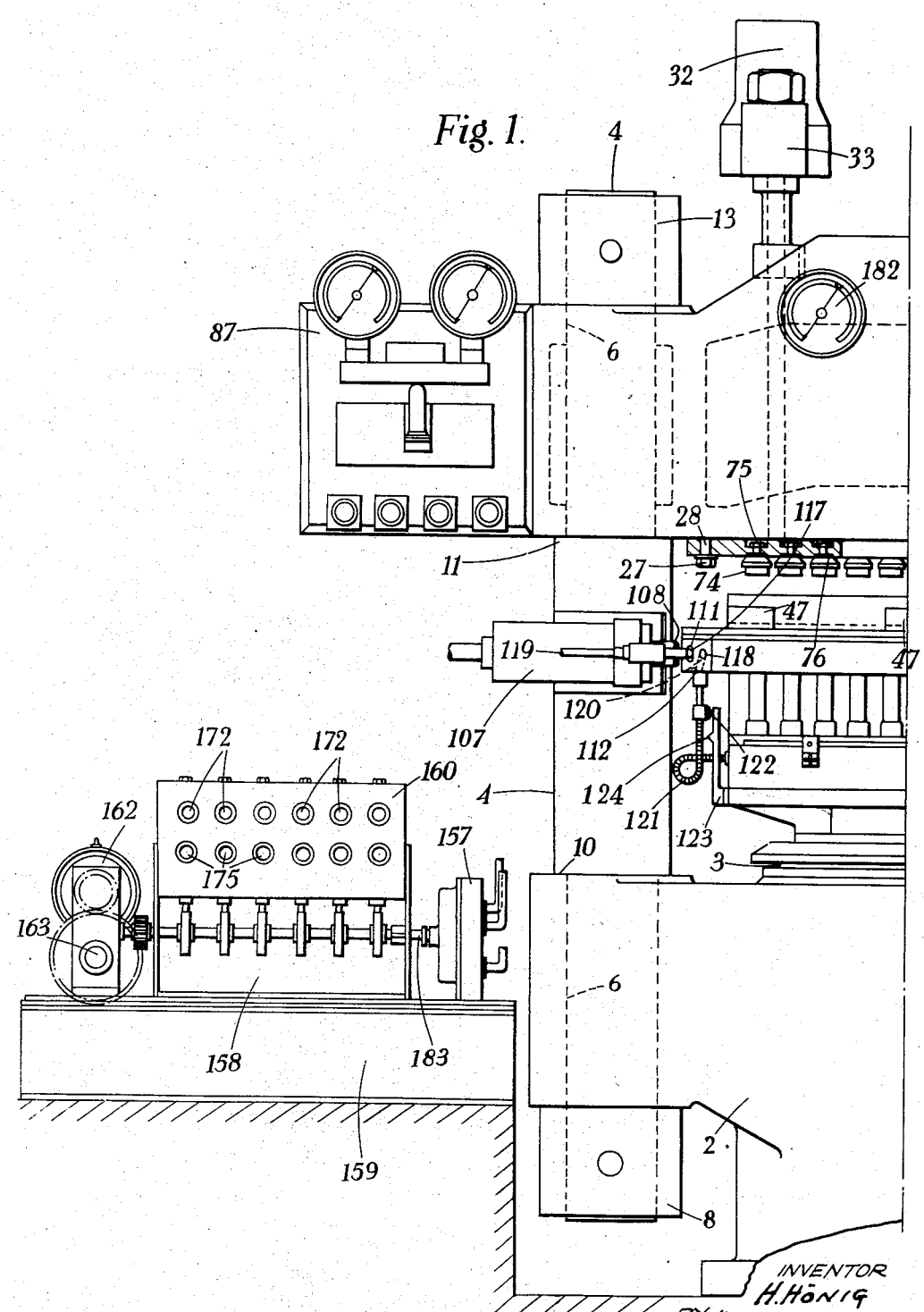
Figure 1 is an elevation of the assembled apparatus in part section.
Figure 2:
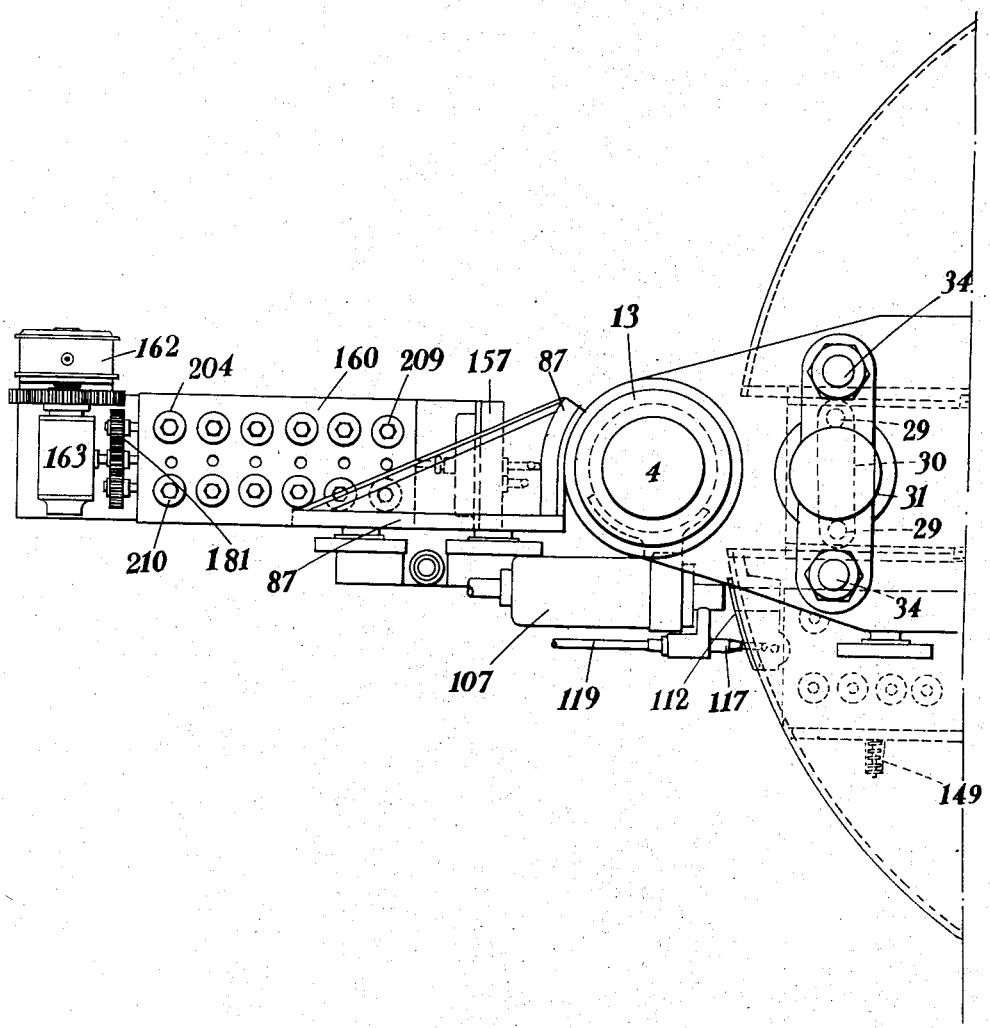
Figure 2 is a plan view of Figure 1.

In Figure 1 the machine rests on a bed plate 1 which forms part of the lower traverse 2, in which the main cylinder and plunger 3 are situated. Two columns 4 and 5 pass through holes 6, 7, in the lower traverse 2 and are secured by nuts 8, 9. The columns rest on the lower traverse 2 on shoulders 10. Shoulders 11 are provided at the upper end of said columns and the upper traverse 12 rests thereon. Nuts 13 secure said upper traverse against upward movement. A rotary table 14 is mounted on said column 5 and said table has three uniformly spaced radial slots 15 therein. Figure 2 shows the table 14 with a complete mold box unit 16 in each of said slots 15. The positions marked in Figure 2 as positions C, D and E will be referred to hereinafter as the molding position, the ejecting position and the filling position respectively. In the ejecting position a girder 17 carries a plunger 18 hydraulically operated in a cylinder 36 and carrying a head 19 on which are mounted ejecting pins 20. A complete molding unit comprises a mold box 16 and a filling box 21, connected by pressure-tight connections 22. In the filling position there is a filling unit 23 attached to the column 5 by a bracket 24. In the molding position the mold box 16 lies directly above the plunger head 25 of the plunger 3. In the molding position the upper traverse 12 carries a die plate 26 secured thereto by nuts and bolts 27, 28, and passing through the die plate 26 are four rods 29, two of said rods being mounted on each of the two connecting members 30. Each of the members 30 is connected to a hydraulically actuated plunger 31 operating in a cylinder 32. Said cylinders 32 are situated in casings 33 mounted on the upper traverse 12 by the members 34 and secured by the nuts 35. The mold box 16 (Figs. 3 and 4) consist of an upper plate 35 carrying twenty molds 37, held therein by nuts 38. The upper plate 36 is attached to the nozzle plate 39 by side plates 40 suitably secured thereto by studs and nuts. Nozzles 41, one for each mold secured to the plate 39 by nuts 42 pass through bottle ejecting sleeves 43 which are slidable thereon. The ejecting sleeves 43 are carried by an ejector plate 44 lying on the plate 39. It will thus be apparent that the plate 44 can move in an upward direction from the plate 39. The bottom plate 45, suitably attached to the nozzle plate 39 has fluid conduits 46 therein making pressure-tight connection with the nozzle members 41. The side plates 40 have lugs 47 thereon to hold said mold box in the slots 15 in the rotating table 14, the lugs 47 resting on the strips 48, attached to the edges of each of the slots 15. The filling box 21 consists of a plate 49 having therein twenty holes 52 (Fig. 2) to receive sleeves 50 carrying filling pipes 51 passing through the table 14 and supported thereon on flanges 53. The bottom plate 54 carries connecting members 55 screwed therein and the pipes 51 pass through said connecting members 55 and are attached thereto by pins 56. It will thus be seen that a complete molding unit (mold box unit 16 and filling unit 21) is mounted in the table in the following manner. The mold box 16 is placed in the slot 15 in the table 14 and is suspended therein with the lugs 47 resting on the strips 48. The filling pipes 51 are passed through holes in the table 14 and rest thereon on the flanges 53. The bottom plate 54 is then attached to the filling pipes 51 by means of the members 55 and the pins 56. The bottom plate 54 has fluid conduits therein consisting of the main fluid conduit 57 (Fig. 5), connecting the conduits 58, 59. The conduits 58, 59 are connected to the chambers 60, there being one of said chambers 60 below each filling pipe 51, said chamber and said pipe being connected through the bottom slide 61 to be described hereinafter. Conduits 62 connect the chambers 60 through the pressure connections 22 to the fluid conduits 46 in the bottom plate 45 of the mold box unit 16.

It will be apparent that three complete molding units can be mounted in the table 14, spaced apart by 120°. It will be seen that in the molding position the mold unit 16 lies directly beneath the upper traverse 12, in the pressing position, the second mold unit 16 lies in the ejecting position D and the third molding unit (16 and 21) lies in the filling position E.

A filling unit 23 carried by the bracket 24 is so disposed, offset from the column 5, that in the filling position E the unit 23 lies directly above the filling box 21. The filling unit 23 consists of an outer casing 63 attached to a block 64 through which two slide plates 65, 66 pass, these slide plates extend outside the block 64 at each side thereof passing through rectangular slots in said block 64. The outer casing 63 carries twenty hoppers 67 tapering down to holes 68 which lie directly above conduits 69 in the block 64. The two slide plates 65, 66 have holes 70, 71 respectively therein, corresponding to the conduits 69 in the block 64. It will thus be apparent that by moving the slider 65 so that the holes 70 are over the conduits 69 material contained in said hoppers 67 can pass into said conduit 69 while the slide plate 66 remains covering the conduits 72. The conduit 69 is made of such dimensions that only the quantity of artificial resin composition or powder required for one bottle molding operation is passed therein for each movement of the slide plate 65. Furthermore when the slide plate 66 is opened after closing of the conduit 69 by means of the slide plate 65, only the requisite amount of powder or the like will fall from the conduit 69 through conduit 72 and into the filling pipes 51 registering with said conduits. This quantity of powder will thus fall as far as the bottom slide plate 61, which has holes 73 therein in registry with the chambers 60, and which is movable to retain said powder or pass it to the chambers 60.

In the pressing position C the mold box unit 16 lies directly above the plunger head 25 of the plunger 3. When the plunger 3 which is hydraulically actuated, rises, the table 25 lifts the entire molding unit in the slot 15 until the top of each of the molds 37 is closed by a closure head 74 secured in the die plate 26 by the nuts 75 and carrying between said nut and said die an electrical heating element 76.

In the ejection position D the mold box unit 16 lies directly above the head 19 of the plunger 18. The ejecting pins 20 are disposed on the head 19 so as to lie along the centre line of the mold box unit 16 and below the bottom plate 45 when the plunger is at its lowest position. The bottom plate 45 and the nozzle plate 37 have holes therethrough disposed centrally of the nozzle members 41, so that when the plunger 18 rises the pins 20 pass through the plates 45 and 39 and raise the ejector plate 44 and the ejecting sleeves 43, the ends of which abut against the neck 77 of the finished bottle 78, thereby pushing said bottles upwards from the molds 37. The mold box 16 is restrained from vertical movement in the ejecting position D by means of a bracketed arm 79, attached to the column 5 and by means of two nuts to a rod 80 mounted on the guides 17. The bracket arm 79 is disposed centrally of the mold box 16 in the ejecting position D.

Each of the molds 37 is surrounded by an electrical heating element 80' suitably insulated, and these are connected together by leads in the mold plate 36. Slip rings 81 situated on the column 5, and insulated therefrom pass current from any suitable source to brushes 82, there being one brush on each of the three rings supplied for use with three phase current. Each of the brushes 82 is connected to a rigid conductor 83 which terminates in a plug connection 84 situated on the table 14. A corresponding plug connection conducts the current to the mold box unit 16 by means of a flexible cable 85 which is connected to the heating elements 80 by means of a further plug connection 86. It is to be understood that there will be a complete unit comprising three brushes, and rigid conductors to take the current to each of the three mold boxes 16 in the table 14. It will further be apparent that the brushes and slip rings allow of continuous heating of the molds during rotation of the table, and that the flexible cables 85 permit of movement of the mold boxes to the pressing position. According to the particular material employed for the molding, it will be desirable to vary the temperature at which the molds are maintained. Furthermore it will be desirable to maintain the molds substantially at the selected temperature. For this purpose the bracket 87 attached to the upper traverse 12 carries a thermostatic relay (shown diagrammatically in Figure 1) to maintain the temperature of the molds substantially constant.

For rotation of the table 14 in order to move a molding unit from one position to the next, a water motor 88 is provided. The water motor 88 (Figs. 6, 7 and 8) comprises a casing 89 surrounding the column 5. The casing 89 is supported at its lower end on a ball race 90 and a sleeve 91 connected to the table 14 by bolts 92 runs on a ball race 93 situated at the upper end of the motor casing 89. The top and bottom of the motor casing are enclosed in a fluid tight manner by packings 94 and 95 and screwed pressure rings 96 and 97. It will thus be apparent that a fluid chamber 98 is provided around the column 5. A fixed abutment 99 is seated in the column 5 (Fig. 7). A moving abutment 100 is secured to the casing 89 by the lug 101. Fluid inlets 102, 103 are provided in the casing 89. Thus when fluid is admitted by the inlet 102, the fluid pressure will act against the moving abutment 100 to rotate the casing 89 about the column 5. The casing 89 carries three clutch members 104 disposed at intervals of 120° round the circumference thereof, these clutch members being urged upwards by springs 105 into engagement with tapered recesses in the lower edge 106 of the sleeve 91. The said recesses are so disposed as to cause sleeve 91 and the table 14 to rotate in such a manner that a mold box 16 will pass successively by the positions E, C, D, upon rotation of the casing 89. The fluid supply at inlet 102 is cut off after a rotation of one third of a revolution. Fluid pressure is then supplied to the inlet 103 and the inlet 102 is connected to exhaust. The fluid pressure will now cause the casing 89 to rotate in a reverse direction through a third of a revolution, the clutch members 104 being gradually withdrawn from the tapered recesses and re-engaging with these recesses after the return rotation. Thus it will be seen that by suitable arrangement of fluid supply, to be described hereinafter, the table can be caused to rotate through a third of a revolution and the motor casing 89 can then be reversed in readiness for the next rotation.

In order to lock the table at the appropriate position after each rotation, a locking unit 107 is mounted on the column 4. This unit (Fig. 9) comprises a pin 108 actuated by a hydraulically operated plunger 109 in a cylinder 110 and adapted to engage in a recess 111 (Fig. 1) in lugs 112, of which three are disposed on the table 14, at intervals of 120°. The cylinder 110 has fluid inlets 113 and 114. The inlet 114 is attached to a source of constant fluid pressure whilst the supply to the inlet 113 is controlled as described hereinafter. When fluid pressure is applied to the inlet 113 and acts on the surface 115, the force of the fluid on the smaller surface 116 is overcome and the pin 108 is moved forward into the recess 111. When the fluid supply to the inlet 113 is cut off and the inlet is connected to exhaust the constant pressure on the surface 116 will cause the pin 108 to be withdrawn from the recess 111.

Connected to the pin 108, so as to move therewith, is a pressure fluid nozzle 117 which engages in a recess 118 in the lug 112, said recess 112 being provided with a packing ring to make a pressure tight connection. The nozzle 117 is connected by a flexible supply pipe 119 to the source of pressure fluid for example air. The recess 118 is connected by a conduit 120 in the lug 112 to a flexible connection 121 with a spring valve 122 situated therebetween. The flexible connection 121 is connected in a pressure tight manner to the main conduit 57 in the plate 54 (Fig. 5). A rod 123 carried by the table 25 has a cam surface 124 adapted to open the valve 122 when the table 25 is raised. Upon lowering of the table 25 the valve will be spring closed. It will be apparent that, at each of the three positions on the table 14 where a molding unit is mounted, there will be a flexible connection 121 and a valve 120 leading from the recess 118 to the main conduit 57.

Figure 3:
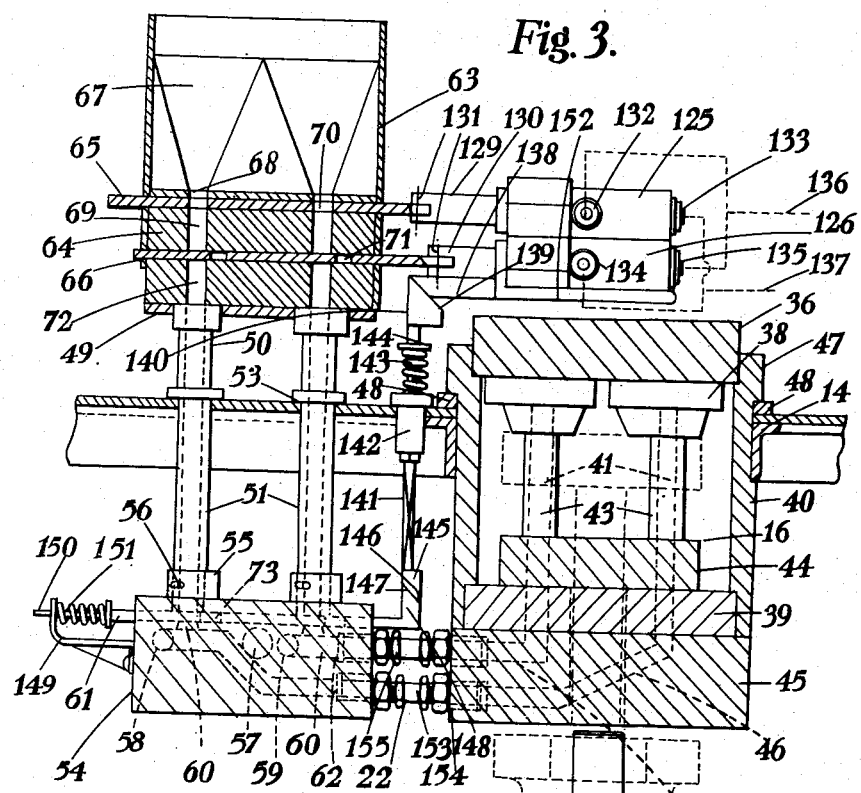
Figure 3 is a section on the line A—B in Figure 2.

It will be understood that each molding unit goes through a cycle of three operations namely filling, pressing and molding and that these three operations are carried out on different molding units substantially simultaneously. I will now describe the operations performed on one unit (16 and 21) in one complete rotation of the table 14. An empty mold box 16 connected to a filling box 21 is rotated until the filling pipes 51 in the said filling box lie directly below the conduits 72 in the block 64 (Fig. 3). The rotation of the table is then stopped and the table is locked in position by the unit 107 as above described.

Cylinders 125 and 126, connected to the block 64 by rods 127 and a strap member 128, are disposed one above the other. Plungers 129 and 130 in said cylinders are connected by bolts and nuts at 131, to the slide plates 65 and 66 respectively. The cylinders 125 and 126 have two fluid inlets 132, 133 and 134, 135 respectively. The inlets 132 and 135 are connected to a common conduit 136, and the inlets 133 and 134 are connected to a common conduit 137. Fluid pressure is applied to the conduit 137 thus admitting fluid to the inlets 133 and 134, and causing the slide plate 65 (shown in the open position in Fig. 3) to open and the slide plate 66 to close. The artificial resin composition or powder in each of the hoppers 67 falls through the holes 68 into each of the chambers 69 formed by the block 64 and the closed slide plate 66. The fluid supply to the conduit 137 is then interrupted and the conduit is connected to exhaust, simultaneously fluid pressure is supplied to the conduit 136 thus applying fluid pressure at the inlets 132 and 135 and causing the plungers 130 and 129 to open the slide plate 66 and close the slide plate 65 respectively.

The plunger 130 carries a cam member 138 having an oblique cam surface adapted to engage with the oblique surface 139 in the member 140. The member 140 mounted on a shaft 141 is carried by a sleeve 142 mounted in a hole in the table 14. A compression spring 143 abutting against a flange 144 on the said shaft 141 maintains the member 140 in an operative position but enables the member to be forced downward to allow subsequent rotation of the table to another position. At the lower end of said shaft 141 a member 145, having an oblique surface 146 oppositely arranged to said oblique surface 139, is mounted. The said surface 146 abuts against the oblique surface 147 on the abutment 148 attached to the slide plate 61. It will thus be apparent that when the plunger 130 opens the slide plate 66, the slide plate 61 is also opened by means of the members 138, 139, 140, 141, 145, 146, 147 and 148. Thus when the slide plate 66 opens the slide plate 61 opens and the powder in the conduits 68 falls through the holes 71 and 73 in the plates 66 and 61 into the chambers 60. On the side of the plate 54 remote from the abutment 148, two brackets 149 are mounted. These brackets carry rods 150 bearing springs 151 which bear against the slide plate 61 and cause it to close the filling pipes 51 when the slide plate 66 is closed by the plunger 130.

In this position therefore, a supply of molding composition sufficient for the production of one bottle has been transferred from the hoppers 67 to each of the twenty chambers 60 in the plate 54.

The table 14 is now rotated through a third of a rotation by the water motor 88, as above described, and is locked in position with the mold box lying immediately above the table 25 on the plunger 3. It is to be understood that the spring retained member 140 will easily pass under the cylinder 126, with the member 140 sliding along the cover plate 152. Simultaneously with the locking of the table a pressure tight connection is made at the recess 118 in the lug 112 as above described. Fluid pressure is then applied to the main cylinder to raise the plunger 3. The plunger head 25 lifts the entire molding unit in the slot 15 until the top of each of the molds 37 is closed by the corresponding closure head 74, which is designed to form the shape of the bottom of the finished bottle 78. The molds 37 are thus closed in a pressure tight manner by the heads 74. Simultaneously with the closing of the molds 37 the cam surface 124 on the member 123, carried by the table 25, operates the valve 122 and admits highly compressed air to the main conduit 57 in the bottom filling plate 54. The air entering the chambers 60 forces the powder or artificial resin composition contained therein along the conduits 62. The bottom plate 54 is connected to the plate 45 of the mold box 16 by conduits 153, stuffing boxes 154 and packing glands 155 being provided at each end of said conduits to make pressure tight connection between the plates 54 and 45. A similar pressure tight connection is provided between each of the twenty conduits 62 in the plate 54 and the twenty conduits 46 in the plate 45. The powder or the like in the chambers 60 is thus forced by the compressed air along the conduits 46 and up the nozzle members 41, being sprayed onto the sides of the mold 37 through holes 156 in the nozzle member 41. Suitable holes 156 are made in the end of the nozzle member 41 so as to direct the powder over substantially the whole area of the mold. The molds 37 are, as above described, maintained at a substantially constant temperature and the powder when sprayed through the holes 156 in the nozzle members 41 becomes sufficiently viscous to adhere to the sides of the mold 37, closed by the die member 74, and to form a substantially uniform coating all over the surface of said mold. It will be apparent that when the compresed air, for example at 200 atmospheres pressure, enters the mold 37 the pressure will rapidly build up to 200 atmospheres and will be maintained for a sufficient time to complete the molding and hardening of the bottle. When the molding is completed the main air valve 157, to be described hereinafter is actuated to connect the interior of the molds to atmosphere. Simultaneously hydraulic pressure is applied to the two plungers 31 in the cylinders 32, and the cylinder containing the main plunger 3 is connected to exhaust. The members 29 are moved downwards by the plungers 31 and pass through holes in the die plate 26 and contact with the top of the mold plate 36 thereby pushing the whole molding unit down to its normal position, where it is suspended in the table 14 by the lugs 47 contacting with the strips 48 running along the edges of the slot 15. By the lowering of the table 25 and the plunger 3 the valve 122 is spring closed when the cam surface 124 moves out of engagement therewith.

The table 14 is now moved through another third of a rotation by the hydraulic motor 88, after the locking pin 108 and the pressure connection member 117 have been withdrawn from connection with the recesses in the lug 112 on the table 14.

The table 14 is then stopped and locked by the unit 107 on the column 4 with another molding unit in the pressing position C and the mold box 16 containing the pressed articles lies in the ejection position D. When the mold box lies above the ejecting cylinder 36, hydraulic pressure is applied thereto to raise the plunger 18 with its head 19 and the ejecting pins 20 thereon. The said pins 20 passing through holes arranged centrally of the plates 45 and 39 (Fig. 3), contact with the ejecting plate 44 causing the ejecting sleeves 43 (Fig. 4), carried thereby to eject the finished bottles 78 by pressing against the neck portions 77 of the said bottles. The said bottles may be removed in any suitable manner as for example by hand.

It will be apparent that since three molding units (16 and 21) are mounted in the table 14 one of the three operations of filling, pressing and ejecting will be performed on each of the molds substantially simultaneously. The three molding units are then rotated to the next stage of operations, the whole apparatus thus being capable of continuous production.

All the operations above described are preferably hydraulically operated, with the one exception that the actual pressing operation is performed by compressed air. For the controlling of all the various operations a control unit 158 suitably mounted on a base 159 is provided. The control unit, shown in details in Figures 10 to 13, comprises a composite valve box 160, cam shafts 161 driven by an electric motor 162 through a suitable reduction gear 163.

The composite valve box 160 consists of six valve units 164, one of said units being shown in section in Figure 10.

The unit 164 has a casing 165 having therein two valve chambers 166 and 167 and a connecting conduit 168. The chamber 166 is connected by the inlet 169 to a source of hydraulic power. The valve chamber 166 containing the valve 170 is thus filled with water, upon lifting of the valve rod 171, by means of a cam, water is passed through the connecting conduit 168 and through the valve chamber 167 and the outlet 172 to the cylinder or the like to be actuated. When the operation of the said cylinder or the like is completed the valve 170 closes and the valve 173 opens to allow the water from the operating cylinder to pass through the port 174 to exhaust through the exhaust outlet 175. When the valve 173 closes, the valve 170 is opened and the water is again admitted to the operating cylinder. The valve 173 consists of a main valve containing subsidiary valve 176 to equalize the pressure on both sides of the main valve 173. It will be understood that each of the six valve units 164 contains two valves, and that all the twelve valves are of similar construction to the valve 173 shown in Figure 10.

The composite valve box 160 comprises six of the units 164, the valve chambers 166 thereof being connected together by a conduit 177 so that water admitted by the inlet 169 (Fig. 12) will fill all of the valve chambers 166, the remaining five inlets being suitably plugged as at 178. A conduit 179 connects all the exhaust outlets 175 together so that the exhaust water can be disposed of rapidly.

The valves in the said composite valve unit 160 are driven by cams on the two cam shafts 161 and 180 which are driven through gearing 181 by an electric motor 162, which is controlled by a time switch 182 in a manner to be hereinafter described. The drive to said cam shafts is taken through a reduction gear 163. All of the cams operating the hydraulic supply valves are single lift cams. From the end of the cam shaft 161 a suitable drive 184 is taken to the shaft 183 of a valve 157 of any suitable kind, here shown diagrammatically as a rotary slide valve. The slide valve 157 consists of a circular slide 185 having on its inner face a substantially L shaped groove 186. The said slide is held by a spring 187 in pressure tight sliding connection with the face 188 of the ported member 189. The member 189 has the inlet port 190 connected to the source of compressed air, the port 191 connected to the pipe 119, and the exhaust port 192 connected to atmosphere. It will be apparent that by rotation of the slide 185, in a clockwise direction (Fig. 13) the port 190 will be covered and the port 191 connected to the port 192 by means of the groove 186.

During the molding operation the air pressure must be maintained in the mold 37 for a short time for example about eight to twenty-five seconds. The motor 162 is therefore connected to a time switch 182 (shown diagrammatically in Fig. 1), and after the molding unit has been raised by the head 25 and has been closed by the die members 74, the said time switch opens the current circuit to the motor 162 thereby stopping the motor and therefore the cam shafts 161 and 180, when the air inlet port 190 and the port 191 to the connection 119 are in connection with one another by means of the groove 186. When the pressure has been maintained in the mold for a sufficient time the time switch 122 closes the motor circuit and the operation of the entire apparatus proceeds.

Figure 14 shows a general lay out of all the apparatus employed diagrammatically. 193 is a water pump which delivers water to an accumulator 194 the top of which is connected by a pipe 195 to a container 196 which is in connection with the air compressor 197. Thus the connection pipe 195 provides an air buffer in the water container 194. The air container 196 is in direct connection with the compressor at 198 and with the inlet port 190 in the valve 157 at 199.

A hydraulic intensifier 200 of known type per se is connected by cocks 201, 202 to the main water pipe line 203. It will be apparent that the intensifier need only be included in the circuit when a water pressure higher than that provided by the compressor is required.

The main pipe line 203 conducts water at high pressure to the inlet 178 (Fig. 12) thus supplying each of the valves 204, 205, 206, 207, 208, 209 with water. The ports 172 of the valves 210, 211, 212, 213, 214, 215, are connected respectively to the upper cylinders 32, the conduit 136, the conduit 137 (shown in Fig. 3), to the water motor inlet 102, the water motor inlet 103, and the conduit 216, the connections being shown diagrammatically in Fig. 14. The conduit 216 is connected to the locking unit 107, the ejecting cylinder 36 and the main cylinder containing the plunger 3. The inlet 114 of the locking unit 107 is connected to the main supply line 203 by a conduit 217. All the exhaust ports 175 are connected together by the conduit 179 and are all maintained open to exhaust.

Assuming now that the table 14, carrying three complete molding units (16 and 21), is stationary after a completed cycle of operations. The valve 207 is opened by its cam and admits water through the valve 213 to the inlet 102 of the water motor 88, thereby causing the motor 88 and the table 14 to rotate through 120°. The valve 207 is then closed by its cam and the motor 88 stops. The valve 209 is then opened by its cam to admit water through the valve 215 to the conduit 216 and thus to operate the locking unit 107, the main cylinder containing the plunger 3 and the ejecting cylinder 36. Subsequently the air valve 157 admits air under pressure to the conduit 119, this conduit being connected by the member 117 and the recess 118 to the flexible connection 121 through the valve 122 opened by the cam member 124. Immediately the main air valve is opened, the time switch 182 opens the circuit of the motor 162 and thus stops the operation of the cam shaft 161 and 180, the compressed air then completes the pressing operation in the molds 37.

Simultaneously with the opening of the valve 209, the valves 205 and 206 are operated by their cams and pass water through the valves 211 and 212 and the conduits 136 and 137 to operate the filling unit in the manner described above.

After the interval of time required for the completion of the pressure molding, the time switch 182 closes the motor circuit and thus puts the cam shafts 161 and 180 into operation again. As soon as rotation of the cam shafts recommences the air valve 157 connects the port 191 to atmosphere through the port 192. The valve 204 is operated by its cams and admits water through the valve 210 to the upper cylinders 32, which cause the plungers 29 to press the moldbox down and simultaneously with the opening of the valve 204, the valve 215 is opened to exhaust by its cam and the plunger 3 is lowered together with the ejector plunger 18, and the locking unit comes out of engagement with the table 14 in the manner previously described. Simultaneously with the above mentioned operation the valve 208 is opened by its cam and admits water through the valve 214 to the motor inlet 103, and the motor casing 89 is then rotated in a reverse direction in readiness for the next rotation, when the casing has rotated so that the clutch members 104 engage the next succeeding recess the valve 208 is closed. The table 14 then rotates in the manner previously described. It will be understood that when the head 25 rises the mold block returns the plungers 29 to their raised position the valve 210 having been opened to exhaust by its cam.

Whilst in the foregoing I have described a preferred form of apparatus according to this invention it is to be understood that various modifications may be made without departing from the scope thereof.

I claim:—

1. Apparatus for molding hollow articles from artificial resins comprising a separable hollow mold, means for heating said mold, means for blowing a molding powder against the inner walls of said mold to line the same and for applying fluid under pressure to the inside of the lined mold.

2. Apparatus for molding hollow articles from artificial resins comprising a plurality of mold assemblies, a plurality of receiving chambers therein, a charging station for supplying moldable composition to said receiving chambers, a molding station, means at said molding station to co-operate with said mold assemblies to form complete molds, means for admitting fluid under pressure through said receiving chambers to said complete molds, an ejecting station and means for passing said mold assemblies to said stations in succession.

3. Apparatus for molding hollow articles from artificial resins comprising a plurality of separable molds, means for introducing fluid under pressure to the interior of said molds, means for introducing a moldable composition into the path of the fluid prior to its entry into the molds, means for heating the molds and means for controlling said composition introducing means and said fluid introducing means to operate in succession.

4. Apparatus for molding hollow articles from artificial resins comprising a plurality of open-ended molds, means for closing said molds at one end, fluid pressure means for blowing a molding composition into the closed molds on to the inner walls thereof and means for heating the molds.

5. Apparatus for molding hollow articles from artificial resins comprising a plurality of mold assemblies, each comprising a plurality of molds open at one end, means for closing said molds at their open ends, nozzles carried by said mold assemblies and extending into said molds, conduits connected to said nozzles, means for supplying moldable composition to said conduits, means for supplying fluid under pressure to said conduits, means for moving said mold assemblies successively into operative relation with said composition supplying means and into operative relation with said mold closing means, and said pressure fluid supply means.

6. Apparatus for molding hollow articles from artificial resins comprising a plurality of mold assemblies each comprising a plurality of molds open at one end, a plurality of nozzles extending respectively into said molds from the other ends, and a plurality of conduits connected respectively to said nozzles, a movable carrier for said assemblies, means for suplying moldable composition to said conduits, means for supplying fluid under pressure to said conduits, means for closing the molds of a mold asembly at their open ends, means for heating said molds, and means for moving said carrier to carry said mold assemblies into operative positions for charging the conduits, blowing the moldable composition from said conduits to the walls of the molds.

7. Apparatus for molding hollow articles from artificial resins comprising a separable hollow mold, a perforated nozzle extending into said mold, a chamber connected to said nozzle, means for supplying a moldable composition to said chamber, means for supplying air under pressure to said chamber and thence to said mold, means for heating said mold and means for automatically causing in sequence charging of said chamber, closing said mold, and supplying of fluid under pressure to said chamber and mold and maintaining the pressure until molding is completed.

8. Apparatus for molding hollow articles from artificial resins comprising a movable carrier, means for moving said carrier intermittently, a plurality of mold blocks carried by said carrier, a plurality of molds in each said mold block, means adjacent to the path of said mold blocks and co-operating therewith for closing said molds, means for heating said molds, a plurality of filling chambers, means for supplying moldable composition to said filling chambers, means for blowing moldable composition from said chambers to said molds, and common control means for said carrier moving means, said mold closing means, said composition supplying means and blowing means.

9. Apparatus for molding hollow articles from artificial resins, comprising a rotary carrier, a plurality of mold assemblies carried by said carrier, a plurality of molds open at one end in said mold assemblies, a plurality of nozzles extending into said molds from their other ends, an ejector tube slidably mounted on each nozzle, a conduit connected to each nozzle, a filling chamber in each conduit, a closable inlet for molding powder to each filling chamber, means for supplying molding powder to said filling chamber when the mold assembly is in one position, means for closing the molds of a mold assembly when the assembly is in another position, means for supplying fluid under pressure through said chambers and conduits and nozzles to the interior of said molds when the mold assembly is in said second position, means for heating the molds, means co-operating with said ejector tubes for ejecting molded articles when the mold assembly is in another position, the arrangement being such that three mold assemblies can be at the three respective positions at the same time, and means for intermittently rotating the carrier to bring the mold assemblies into successive operative positions.

10. Apparatus for molding hollow articles from artificial resins comprising a horizontally movable rotary carrier, means for intermittently rotating said carrier, means for locking said carrier in predetermined positions, means arranged above said carrier for supplying moldable composition in definite quantities to a plurality of chambers carried by said carrier when the latter is locked in position, means connecting said chambers with the interior of said molds, means for closing said molds spaced from said supply means, means for suplying fluid under pressure through said chambers to said molds when the latter are closed, means for heating said molds and means for ejecting molded articles from said molds, spaced from said mold closing means.

11. Apparatus for molding hollow articles from artificial resins comprising a rotary carrier rotatable about a vertical axis, a plurality of mold assemblies slidably mounted for vertical movement in said carrier and equally spaced around said carrier, each mold assembly comprising a plurality of molds open at one end, a plurality of nozzles extending respectively into said molds from the other end, a plurality of filling chambers connected to said nozzles, and closure means for said chambers located above them, fluid inlet means carried by said rotary carrier corresponding in number and arrangement to the number of mold assemblies, a flexible connection between each fluid inlet means and the filling chambers of the respective mold assembly, means above said carrier for supplying moldable composition to a mold assembly when in position thereunder, a vertically movable plunger adjacent said carrier, a plurality of mold closure heads opposite said plunger for closing the molds of an assembly when the latter is moved by the plunger towards said heads, means for supplying fluid under pressure through said chambers and nozzles to the interior of said molds when the latter are closed, means for heating said molds, means for ejecting molded articles from said molds, means for intermittently rotating said carrier to bring said mold assemblies into successive operative positions, and common control means for said carrier rotating means, said material supply means, said plunger, said fluid supply means and said ejecting means.

12. Apparatus for molding hollow articles from artificial resins comprising a rotary carrier, a plurality of mold assemblies carried by said carrier, each assembly comprising a plurality of molds, means for intermittently rotating said carrier, means for heating said molds, means for blowing moldable composition successively into the molds of each assembly so as to line them and for introducing fluid under pressure into the interior of the lined molds, means for opening the molds, means for ejecting the molded articles from the opened molds, and a time switch for controlling the time during which fluid under pressure is admitted to the interior of the heated molds.

13. Apparatus for molding hollow articles from artificial resins comprising a separable hollow mold, means for heating said mold, means for blowing a molding powder against the inner walls of said mold to line the same and for applying fluid under pressure to the inside of the lined mold, and means for controlling the time during which fluid under pressure is applied to the inside of the mold.

14. Apparatus for molding hollow articles from artificial resins including a rotary carrier, a plurality of molds carried by said carrier, a plurality of filling chambers carried by said carrier and connected respectively with said molds, a filling chamber charging station, a mold charging and pressure molding station, means at said last-named station for supplying fluid under pressure to the interior of said molds through said filling chamber, an article ejecting station, means for rotating said carrier intermittently to convey said molds successively to and past said stations, means for locking said carrier in position with said molds at said respective places, and common control means for said carrier rotating and locking means.

15. Apparatus for molding hollow articles from artificial resins comprising a separable mold, a perforated nozzle extending into said mold, a filling chamber, a conduit connecting said filling chamber to said nozzle, a hopper, a measuring chamber below said hopper, means for alternately admitting material from said hopper to said measuring chamber and discharging it therefrom into said filling chamber, means for heating said mold and means for supplying fluid under pressure to said filling chamber and then to said mold.

16. Apparatus for molding hollow articles from artificial resins, comprising a rotary table, a plurality of mold blocks mounted in said table for vertical movement therein, each mold block comprising a plurality of molds open at one end, stationary closure means for said molds, means for moving said mold blocks in said table against said closure means to close said molds, means for heating said molds, means for blowing artificial resin composition into the interior of said molds to line the same and for supplying air under pressure to the interior of the lined molds and means spaced from said closure means for ejecting molded articles from said molds.

17. Apparatus for molding hollow articles from artificial resins comprising a horizontally rotatable table, a plurality of mold assemblies carried by said table so as to be vertically movable, said assemblies being equally spaced apart and each comprising a plurality of molds open at the top, a plurality of perforated nozzles extending upwards into said molds, ejector sleeves surrounding each nozzle and vertically movable thereon and forming a closure between said nozzles and said molds, filling chambers connected to said nozzles, inlets to said filling chambers from above, a slide closure for said inlets, and a fluid supply conduit to said filling chambers; a plurality of supply hoppers above said table, outlets from said hoppers for registering with the inlets to the filling chambers, a pair of alternately operable slide closures below said hoppers, hydraulic means for operating said slide closures, a vertically movable hydraulic plunger below said table and spaced from said hoppers so that when one assembly is in registry with said plunger the next one is in registry with said hoppers, a plurality of closure heads above said plunger for closing the molds of a mold assembly raised by said plunger, a plurality of fluid supply inlet connections carried by said table and connected respectively to said fluid supply conduits, hydraulically movable supply means for engagement with a fluid supply inlet connection when the corresponding assembly is raised by said plunger, means for controlling the supply of fluid under pressure to said movable supply means, a hydraulic plunger above said first plunger, stripping means carried by said second plunger for separating the mold assembly from the closure heads when molding is completed, a third hydraulic vertically movable plunger below said table spaced from said first plunger so that when one assembly is above said third plunger the preceding one is above said first plunger, means carried by said third plunger for raising said ejector sleeves to eject molded articles from said molds, means for heating said molds, hydraulic means for rotating said table intermittently through a distance sufficient to take a mold assembly from one station to the next, valve mechanism for controlling said hydraulic means and common driving means for said valve mechanism and said fluid supply control means.

HEINRICH HÖNIG.